US010911885B1

(12) United States Patent
Chemistruck et al.

(10) Patent No.: US 10,911,885 B1
(45) Date of Patent: Feb. 2, 2021

(54) AUGMENTED REALITY VIRTUAL AUDIO SOURCE ENHANCEMENT

(71) Applicant: Microsoft Technology Licensing, LLC, Redmond, WA (US)

(72) Inventors: Michael George Chemistruck, Issaquah, WA (US); Nikunj Raghuvanshi, Redmond, WA (US); Kyle Robert Storck, Kirkland, WA (US); Noel Richard Cross, Seattle, WA (US); Hakon Strande, Woodinville, WA (US); Travis Joseph Fodor, Holmdel, NJ (US); Keith William Godin, Redmond, WA (US); Ashutosh Vidyadhar Tatake, Seattle, WA (US); Jonathan G Paulovich, Redmond, WA (US)

(73) Assignee: Microsoft Technology Licensing, LLC, Santa Clara, CA (US)

( * ) Notice: Subject to any disclaimer, the term of this patent is extended or adjusted under 35 U.S.C. 154(b) by 0 days.

(21) Appl. No.: 16/780,326

(22) Filed: Feb. 3, 2020

(51) Int. Cl.
H04S 7/00 (2006.01)
G06F 3/01 (2006.01)
G06K 9/00 (2006.01)
G06T 19/00 (2011.01)
H04S 5/00 (2006.01)

(52) U.S. Cl.
CPC .............. H04S 7/303 (2013.01); G06F 3/011 (2013.01); G06K 9/00671 (2013.01); G06T 19/006 (2013.01); H04S 5/005 (2013.01); H04S 2400/11 (2013.01); H04S 2400/15 (2013.01); H04S 2420/01 (2013.01)

(58) Field of Classification Search
CPC ...... H04S 7/303; H04S 5/005; H04S 2400/11; H04S 2400/15; H04S 2420/01; G06F 3/011; G06K 9/00671; G06T 19/006
See application file for complete search history.

(56) References Cited

U.S. PATENT DOCUMENTS 9,122,053 B2 9/2015 Geisner et al.
9,230,368 B2 1/2016 Keane et al.
9,432,790 B2 8/2016 Raghuvanshi et al.
(Continued)

FOREIGN PATENT DOCUMENTS

WO 2018224847 A2 12/2018

OTHER PUBLICATIONS

Godin, et al., "Audio in Mixed Reality", Retrieved From https://docs.microsoft.com/en-us/windows/mixed-reality/spatial-sound, Nov. 7, 2019, 5 Pages.
(Continued)

Primary Examiner — Mark Fischer
(74) Attorney, Agent, or Firm — Schwegman Lundberg & Woessner, P.A.

(57) ABSTRACT

A mobile device implemented method provides audio from a virtual audio source in an augmented reality view of a scene. The method includes operations of sending scene identification data to a server storing precomputed acoustic parameters for multiple scenes, receiving precomputed acoustic parameters corresponding to the scene, aligning the view to register the audio to the augmented reality view of the scene, and rendering and playing the audio using the obtained acoustic parameters.

20 Claims, 9 Drawing Sheets

(56) References Cited

U.S. PATENT DOCUMENTS

| | | |
|---|---|---|
| 9,510,125 B2 | 11/2016 | Raghuvanshi et al. |
| 10,248,744 B2 | 4/2019 | Schissler et al. |
| 10,251,013 B2 | 4/2019 | Bygrave |
| 10,448,189 B2 | 10/2019 | Link |
| 2014/0132628 A1 | 5/2014 | Hoff, III |
| 2014/0347391 A1* | 11/2014 | Keane ................ G06F 3/04815 |
| | | 345/633 |
| 2019/0356999 A1 | 11/2019 | Raghuvanshi et al. |

OTHER PUBLICATIONS

Hong, et al., "Spatial Audio for Soundscape Design: Recording and Reproduction", In Journal of Applied Sciences, vol. 7, Issue 6, Jun. 16, 2017, pp. 1-22.

Lalwani, Mona, "3D Audio is the Secret to Hololens' Convincing Holograms", Retrieved from https://www.engadget.com/2016/11/02/microsoft-exclusive-hololens-spatial-sound/, Nov. 2, 2016, 17 Pages.

* cited by examiner

AUGMENTED REALITY VIRTUAL AUDIO SOURCE ENHANCEMENT

BACKGROUND

Untethered mixed reality presents the unique computational challenge of modeling reality faithfully on a resource-constrained platform such as augmented reality devices, or mobile phones. A critical aspect of realism is ensuring that the sounds from virtual sources behave correctly within the physical world, such as a virtual talker walking around a physical corner getting progressively occluded and correctly reverberated. Such effects require modeling of detailed wave diffraction effects of virtual sounds against real geometry. Both geometry acquisition and wave simulation are computationally intensive processes. Mobile devices generally have insufficient computing resources to perform detailed acoustic modeling to render virtual sound sources in a realistic manner.

SUMMARY

A mobile device implemented method provides audio from a virtual audio source in an augmented reality view of a scene. The method includes operations of sending scene identification data to a server storing precomputed acoustic parameters for multiple scenes, receiving precomputed acoustic parameters corresponding to the scene, aligning the view to register the audio to the augmented reality view of the scene, and rendering and playing the audio using the obtained acoustic parameters.

DETAILED DESCRIPTION

Figure 1:
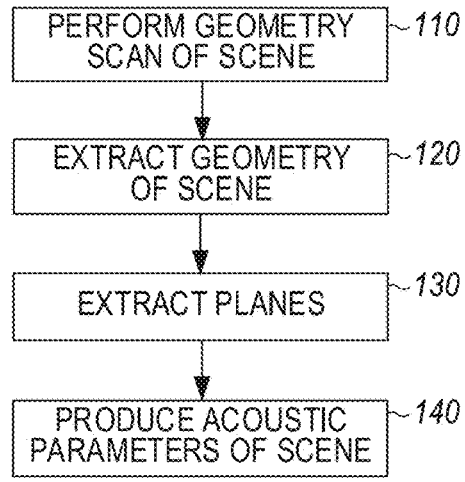
FIG. 1 is a flowchart illustrating a computer implemented method of producing an acoustic file corresponding to a scene according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component" "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The vast majority of auralization systems are based on high-frequency geometric-acoustic approximation assuming ray propagation of sound. In one such system, for each source, an impulse response is computed and then parameterized physically via delays and amplitudes for discrete reflections, each filtered and spatialized individually along with a single statistical late reverberation for a room assumed to contain the source and listener. A more recent system is designed for a more general range of spaces and employs computation and convolution of each source's impulse response at the listener. Processing may consume the entire compute power of one or several workstations. This fits a target application of interactive walk-through in computer-aided-design applications.

Games and virtual reality (VR) on the other hand impose far tighter CPU budgets of ~0.1% of a CPU core for acoustic calculation per moving source. Rather than exact acoustical prediction, perceptually convincing cues are produced that vary smoothly on motion and have the expected correspondence to visual scene geometry. Many geometric acoustic systems have been recently proposed with these applications in mind, accelerating computation by sacrificing accuracy, such as by ignoring diffraction modeling. CPU usage in such systems still remains a concern for wide practical adoption.

Systems based on wave acoustics avoid high-frequency approximation, but the high cost of numerical wave simulation requires precomputation on static scenes. One such system meets the performance and robustness goals for interactive applications, enabling recent adoption in games and a VR operating system shell. To limit memory usage, lossy compression is performed by transforming simulated spatial fields of impulse responses to perceptual parameter fields. Runtime computation is reduced to interpolated lookup in the para-metric field data for any source/listener location. The set of parameters is then synthesized into an impulse response for efficient application on the source sound.

One prior method incorporates reverberation as a parameterized data stream into object-based spatial audio formats. The focus of the method is on encoding for distribution and playback on traditional linear media like movies.

Parametric artificial reverberators are commonly used. Although physically-inspired, these signal processing techniques are designed primarily for efficient natural-sounding reverberation with perceptual control. Controls are designed to affect independent dimensions of the auditory experience. This ensures that as the number of controls increases, the design process does not suffer from combinatoric explosion.

In various embodiments of the present inventive subject matter, precomputed sets of acoustic parameters are made available for multiple scenes, such as a room. A user with an augmented reality (AR) device may enter a room, send information identifying the room, and receive a set of acoustic parameters for the room. Audio from a virtual sound source within the room is rendered by the AR device. The sound source may be representative of a virtual footstep, a mouth of a virtual individual in the room, a breaking vase in the room, or any other suitable arbitrary audible signal that is intended to originate from a virtual source in the room. The acoustic parameters may be produced by a dynamic perceptual parameterization of impulse responses derived from a simulation of a prior scan of the room or other physical space. By using cloud storage, with acoustic modeling data indexed based on a physical location, multiple users can reuse the results of this expensive simulation without additional costs.

Accurate physical acoustics are provided via the AR device. The acoustics include diffraction performed during rendering of audio on the AR device, which may be an untethered mixed reality device such as a Microsoft HoloLens® 2 device. In a first step, a space, also referred to as a scene, is scanned using a device with surface reconstruction capabilities such as the HoloLens® 2 device.

Acoustic simulation is performed on the scanned geometry of the space using cloud-based computing resources. Results of the simulation include an acoustic data file that is downloaded to the device and associated with a spatial anchor for that space or AR device resources if the AR device has sufficient resources. The spatial anchor may be thought of as a unique identifier of the scene, such as a table or other object to associate scene geometry, acoustic metadata, and alignment information with the scene. In some embodiments, the AR device could perform some or all of the processing associated with generation of the acoustic parameters that are then made available to other AR devices entering the space. When the user next walks into the space, the spatial anchor is identified, its associated acoustic data downloaded, and scene alignment is performed to registered virtual acoustics data to the real scene.

Precomputation and runtime acoustic rendering may be performed using a publicly available Microsoft Project Acoustics system. This allows fast, realistic rendering of virtual sound fields within the real world in untethered mixed reality for the first time. The rendering can also be performed on a mobile device such as an Android smartphone.

Project Acoustics is a wave-based acoustics engine for 3D interactive experiences. The engine models wave effects like occlusion (reduction in loudness from geometry), obstruction, portaling (funneling sounds through a door) and reverberation effects in complex scenes without requiring manual zone markup or CPU intensive raytracing. Project Acoustics' philosophy is similar to static lighting: bake detailed physics offline to provide a physical baseline and use a lightweight runtime to accurately represent the acoustics of a virtual world, or in this case, a geometric scan of a physical space. Project Acoustics couples real sound wave based acoustic simulation with traditional sound design concepts. It translates simulation results into traditional audio DSP parameters for occlusion, portaling and reverb.

FIG. 1 is a flowchart illustrating a computer implemented method 100 of producing an acoustic file corresponding to a scene. At operation 110, a scene, such as a space or room to be simulated is scanned using a device, such as a Microsoft HoloLens® 2 device, by slowly walking around the room and looking at all the surfaces (i.e. walls, ceiling, floor). In further embodiments, multiple devices may be used to perform the scan and collaborate to contribute geometry. Different devices, such as AR devices and other devices that may utilize LIDAR or other ranging mechanisms may be used in further embodiments. The scan comprises a geometry scan and may be performed by any device that can capture distances to objects and surfaces within a space and generate a triangle mesh representation of the space. Once the entirety of the room is scanned, the geometry is extracted at operation 120. The extracted geometry is processed to extract planes at operation 130 out of the captured triangles. An API running on the AR device, or other device, such as a personal computer, that receives the extracted geometry and performs an operation 130 to provide what is referred to as a water-tight, or sound-tight geometry, with no spaces through which acoustic energy may be lost.

At operation 140, the sound-tight geometry is sent to computing resources, such as a server or compute cluster to perform a Microsoft Project Acoustics bake on it. Project Acoustics includes an efficient wave propagation-based audio design system that creates an acoustic rendering that sounds natural, while keeping CPU usage modest and providing designer control. The Project Acoustics bake produces acoustic parameters that represent the acoustics of the physical space/room. Other types of solvers other than wave-based simulations may be used in further embodiments. The selection of such a simulation solution may be based on cost, latency, compute power, acoustics quality, and other factors as desired.

The acoustic parameters are saved in storage, such as cloud storage. A spatial anchor is identified for each space and used to uniquely identify each scanned space. The spatial anchor may thus be used to access the storage to obtain the acoustic parameters that are stored for each space.

In one embodiment, the bake may be performed by the Project Acoustics engine. A pre-bake starts with setting up the bake by selecting which geometry responds to acoustics, by, for example, ignoring light shafts. The bake comprises an analysis step to perform voxelization (representing the space with three-dimensional cubes) and other geometric analysis on the scene based on selections above. On bake submission, voxel data is sent off to Azure which performs a simulation and returns an acoustics game asset. At run time, the game asset is loaded into the user device, and rendered.

The simulation may be wave-based simulation based on the extracted geometry. The wave-based simulation can be computed in terms of a seven-dimensional spatially varying acoustic response pertaining to the extracted geometry: S (t, $p_s$, $p_r$) where t is time, $p_s$ is source location in the space, and $p_r$ is receiver location in the space.

An example simulation is now described in further detail. The engine may execute a first numerical simulation with a sample audio signal when the source is positioned at approximately a center of the source. This simulation can be referred to herein as an "oracle" simulation. Source locations, in an example, can be chosen based on k-means clustering of early decay time derived from the initial simulation undertaken by the engine. Early decay time is a standard room acoustic metric that quantifies how fast sound decays when emitted from different room locations. In another example, a uniform sampling of cells in the space at a suitable down-sampled resolution relative to the simulation grid can be undertaken to determine the plurality of source locations for subsequent simulations. The oracle simulation can also be employed to determine a time duration of a response signal that needs to be simulated at the various source locations. Pursuant to an example, the oracle simulation can be utilized to capture an entirety of the acoustic response in the space at various receiver locations in the space (e.g., at each cell in the voxelized geometry). Pursuant to an example, an input signal provided to the engine can be a pulse, such as a Gaussian derivative pulse of unit amplitude given by the following equation:

$$s(t) = \frac{\sqrt{e}}{\sigma}(t - 5\sigma)\exp\left(-\frac{(t - 5\sigma)^2}{\sigma^2}\right),$$

where $$\sigma = \frac{1}{2\pi v},$$

and where v=500. The Fourier transform of this function is a Gaussian with center at 500 Hz and width spanning an entire frequency range from 0 to 1 kHz, for example.

In another example, a simulation grid can have a resolution of approximately 12 centimeters (e.g., the voxelized geometry of the space can be partitioned into 12-centimeter cubes). Since humans do not perceive sound variation at such high spatial resolution, simulation results can be down-sampled by a factor of 2 to 3, to reduce runtime memory and computational requirements. An early reflection phase of a response signal at a receiver location is sufficient, as the late reverberation phase can be estimated for all response signals using the oracle simulation (as will be described in greater detail herein).

In an example, the simulation can cause a response of the space to be retained as a band-limited Gaussian derivative (rather than a true impulse response). This Gaussian derivative can be converted to an impulse response by way of a simple computation. In the following examples, all functions are discrete vectors of samples in time or frequency, but continuum notation is utilized for the sake of brevity. If an actual response at a receiver at a particular cell can be given by a function l(t) and a corresponding ideal impulse response by I(t) using "⊗" to denote convolution, · to denote element-wise multiplication, and {circumflex over (x)} to denote the Fourier transform of x, the following can be obtained:

$$l(t)=s(t)\otimes I(t)\Leftrightarrow \hat{l}(f)=\hat{s}(f)\cdot \hat{I}(f)$$

To solve for the impulse response, deconvolution can be undertaken using a frequency coefficient division to obtain the Fourier transform of the impulse response, called the Frequency Response (FR).

$$\hat{I}(f) = \frac{\hat{l}(f)}{\hat{s}(f)}.$$

Naively, an inverse Fast Fourier Transform (FFT) on the frequency response Î(f) can yield I(t). Before performing the inverse FFT, a low pass filter can be executed over the frequency response to eliminate frequencies above a particular threshold (e.g., 1 kHz), since such frequencies may be outside a range of the simulation executed by the engine and thus may include numerical errors. In an example, a frequency response vector can be zero padded in all frequency bins above the threshold frequency (e.g., up to a target rate of a certain frequency). In another example, the frequency response can be windowed, which involves attenuating frequencies well before reaching the aforementioned threshold frequency. This can reduce ringing artifacts in the time domain. The impulse response for each receiver location in the space can be obtained by performing an inverse FFT on the windowed frequency response. Pursuant to an example, the following window function chosen from the so-called $\cos^a(x)$ class can be utilized:

$$w(n) = \sum_{k=0}^{3} (-1)^k a_k \cos\frac{2\pi kn}{N}, n \in [0, N-1]$$

$$a = [0.355768, 0.487396, 0.144232, 0.012604],$$

where N is a number of frequency bins from zero to the threshold frequency (e.g., 1 kHz). Frequency values outside such range may already be zero, as discussed above. While the above window function has been given as an example, it is to be understood that any suitable window function can be employed. For instance, a simple rectangular window function can be utilized.

The engine may further include an encoder component that can be employed to compress/factor response signals obtained via numerical simulation undertaken by the simulation executed by the engine. The compressed response signals can be stored as the acoustic parameters stored and sent to an AR device for rendering sound from virtual audio sources.

In one embodiment, the engine receives or determines a number of probe points. Probe points are places in the scene where the acoustic simulation is centered. These probe points are equivalent to a simulation centered around the listener location. The engine may specify uniform spacing of the probe point locations in the horizontal and vertical directions of the space. Other techniques may be used to define the probe point locations. For example, a horizontal spacing of 2 to 4 meters and a vertical spacing of 1.6 meters of probe points may be used. Probe points may be placed throughout the confines of the space. The probe point locations may be chosen to include the locations in the space that a listener may exist or a subset of the locations. Any probe samples whose corresponding voxel lies outside such a region of interest may be rejected. When acoustical reciprocity is used to calculate the propagated audio signal, which requires switching the source and listener positions, listener navigation may be emphasized when choosing probe point locations.

At each probe point, $x_s \in x_s$, a geometric shape is simulated around the probe point since sound attenuates due to occlusion/absorption and with distance. For example, the simulation may use a vertical cylinder with a specified radius and top and bottom heights. In at least one example, the simulation may add a padding layer of air around the geometric region, which aids in run-time extrapolation. The outer region of the space is later referred to as the maximal spatial constraint for the simulation.

Since the field to be simulated varies with time, a time constraint for the simulation may be chosen. In at least one example, rather than storing the entire impulse response, the computing resource may store portions of the impulse response that correspond to the manner in which the human ear and brain process sound. In particular, the computing resource may capture three transient phases of an acoustical impulse response: the direct sound; early reflection; and late reverberation. Therefore, the time constraint for the simulation may provide enough time to capture these phases of the impulse response plus time and to account for line-of-site delay from the probe point to the maximal spatial constraint of the geometric region specified above ($t_{max} = \Delta_{DS} + \Delta_{ER} + \Delta_{LR} + \Delta_C$), where the variables represent the durations of the direct sound: early reflection; and late reverberation phases of the impulse response respectfully and Ac accounts for the line-of-sight delay from the probe point to the maximal spatial constraint).

For example, the time constraint may be set to approximately one second assuming that the direct sound portion of an impulse response may be approximately 5 milliseconds: the early reflections portion of an impulse response vary approximately between 100 and 200 milliseconds depending on the environment geometry and material and locations of the source and listener; and the later reverberations portion of an impulse response may carry on for some time depending on the environment volume and surface area. In some examples, the particular lengths of the phases may vary based on an environment type.

The simulation may use the constraints provided above, including, but not limited to, space geometry and its associated material data, if available: sampling controls; probe source locations: and spatial and time constraints to solve the acoustic wave equation for a response of the space to pulses emitted from the probe point locations. In various examples, the linearized Euler equations may be used to calculate the entire simulation field, but the Euler equations require calculation of both pressure and a velocity vector, which is unnecessary for computation of an impulse response. In applications that require use of intermediate velocities, the linearized Euler equations may be used, but otherwise wave equations provide the sufficient pressure data and require less storage. Any wave equation simulator may be used to calculate the acoustic pressure in the virtual environment respondent to the probe source signal and any hardware may be used to conduct the calculation. For example, one may choose to use a graphical processing unit (GPU)-based adaptive rectangular decomposition (ARD) solver. In some examples, one may use pseudospectral time-domain algorithms in combination with a central processing unit (CPU) to calculate the pressure field resulting from the probe source signal.

Figure 2:
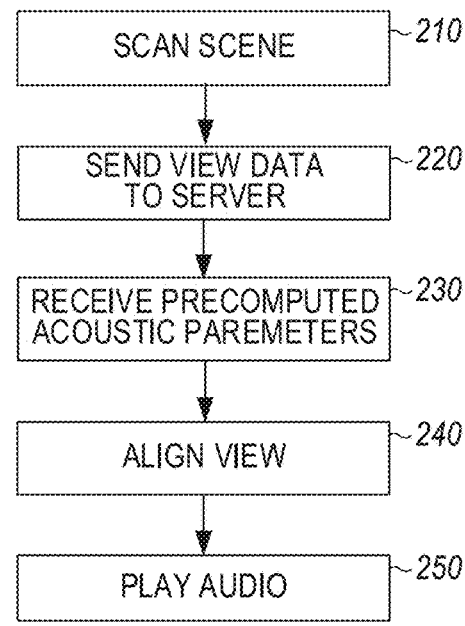
FIG. 2 is a flowchart illustrating a computer implemented method of providing audio from a virtual audio source in an augmented reality view of a scene according to an example embodiment.

FIG. 2 is a flowchart illustrating a computer implemented method 200 of providing audio from a virtual audio source in an augmented reality view of a scene. Method 200 includes an operation 210 performed by an augmented reality device for scanning a scene as viewed via the augmented reality device. In one embodiment, the scan may be a minimal scan configured to obtain scan data representing a minimal geometry of the scene sufficient to identify a spatial anchor in the scene. In some embodiments, the spatial anchor may comprise GPS coordinates provided by the AR device, or may even comprise an address entered by a user or selected from a menu of previously scanned spaces. The spatial anchor is used as an index into a shared, cloud-based data store that multiple devices use to retrieve the acoustic simulation data and acoustic parameters.

At operation 220, scan data corresponding to the spatial anchor in the augmented reality view of the device is sent to a server, such as a set of cloud resources to identify the scene from a plurality of stored sets of precomputed acoustic parameters for scenes having corresponding spatial anchors. If the space is identified via GPS coordinates or otherwise, an identifier of the space may be directly sent to the server. The spatial anchor may be thought of as a unique identifier of the scene, such as a table or other object to associate scene geometry, acoustic metadata, and alignment information with the scene.

At operation 230, precomputed acoustic parameters corresponding to the spatial anchor represented in the scan are received. The precomputed acoustic parameters may be in the form of a compressed file of parameters for probe points within the scene. The precomputed acoustic parameters may be referred to as an acoustic bake. At operation 240, the augmented reality view is registered to the audio from the virtual source location in the scene. Registering may comprise align the resulting acoustic bake with the space and using the alignment to apply the acoustic parameters to all audio sources. This achieves the desired effect of virtual sound sources having the same acoustic properties as physical sound sources located in the real-world space. At operation 250, the audio is played using the obtained acoustic parameters.

Figure 3:
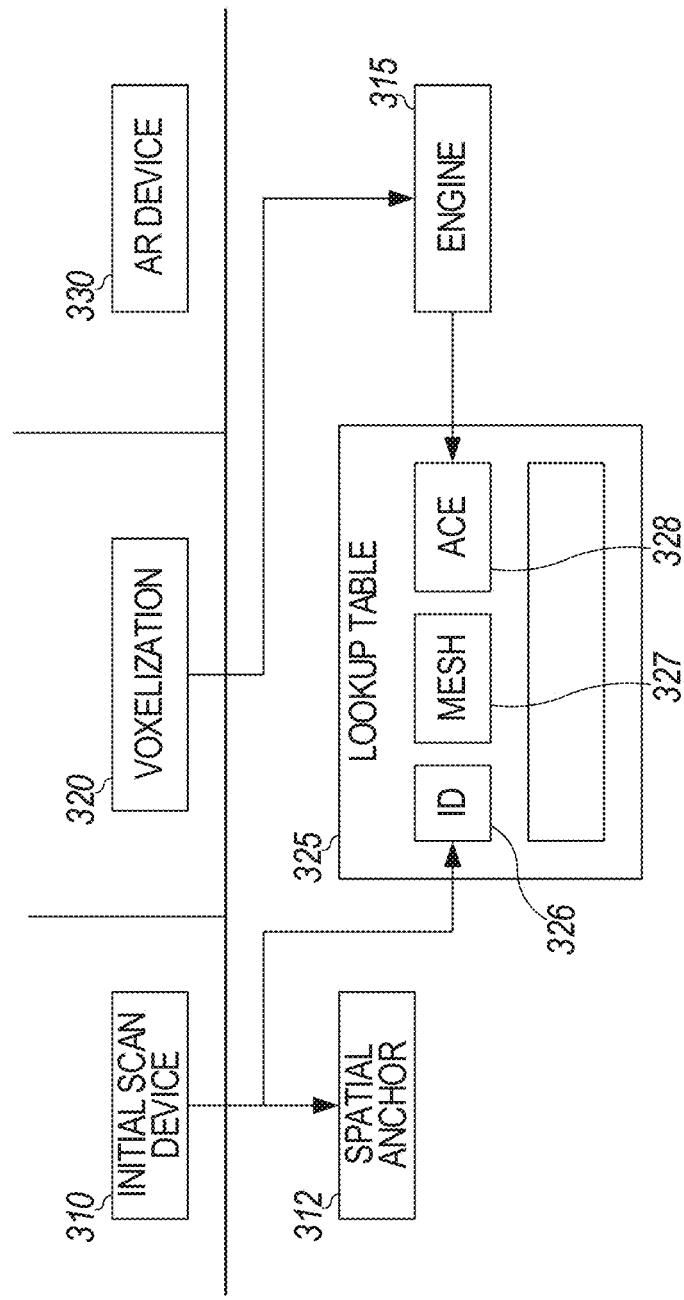
FIG. 3 is a block flow diagram of a software-based architecture for performing augmented reality virtual audio source enhancement according to an example embodiment.
Figure 4:
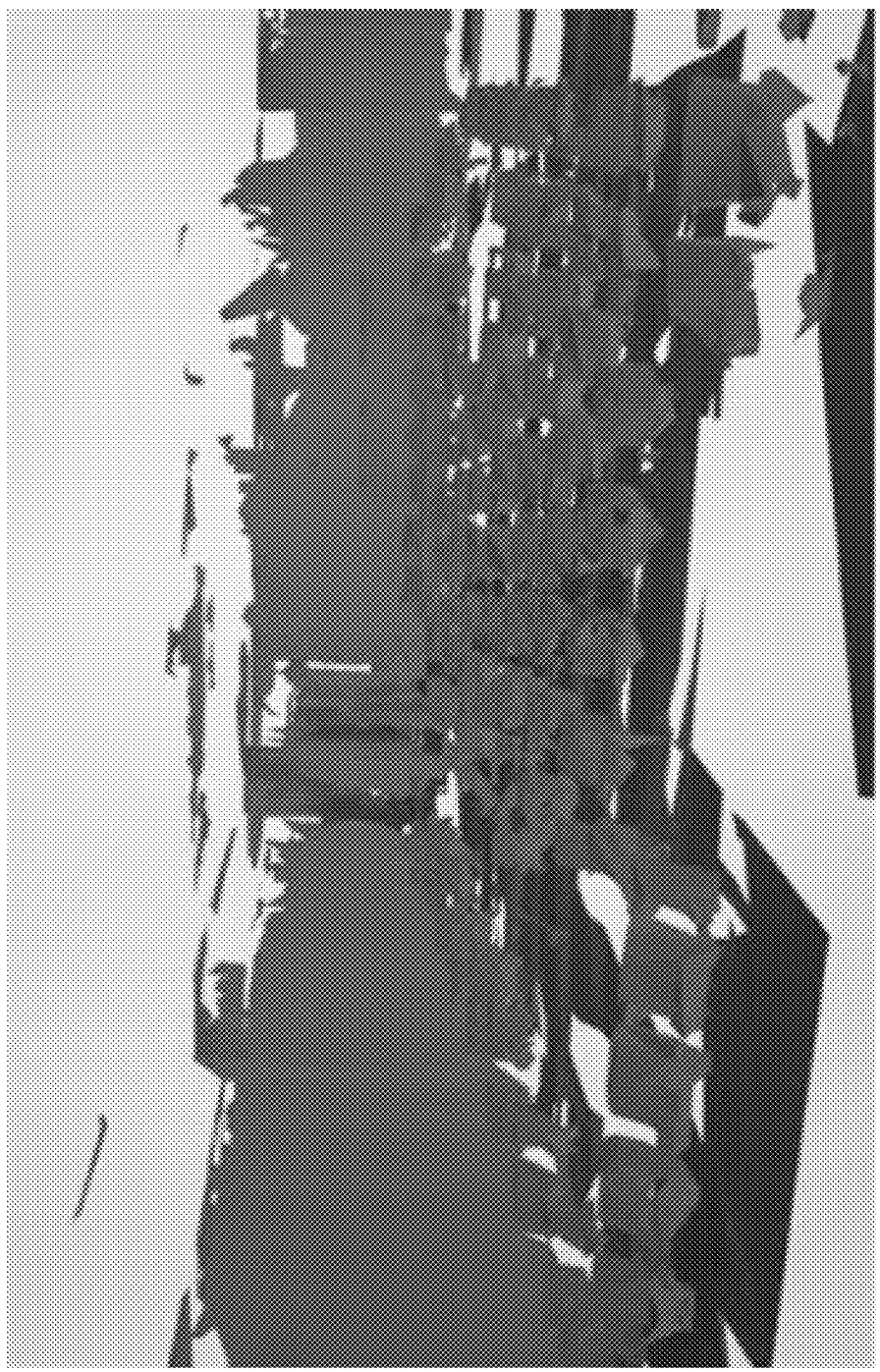
FIG. 4 is a geometric representation of a scanned real-world theatre space according to an example embodiment.

FIG. 3 is a block flow diagram of a software-based architecture 300 for performing augmented reality virtual audio source enhancement according to an example embodiment. An augmented reality device 310, such as a HoloLens® 2 device comes equipped with sensors, such as time of flight sensors or LIDAR (light detection and ranging) that are capable of understanding the physical geometry around the user wearing the device 310. As a user/wearer of the device 310 moves through the real world, the device 310 creates a digital twin, a triangle mesh, in its local memory. An API is exposed to allow acquisition of the created geometry in various forms. An unprocessed captured representation of a space is represented in FIG. 4 corresponding to a real-world theater room. A spatial anchor 312 may also be identified such as by using Azure Spatial Anchors.

The room or scene geometry is made up of many triangles. Notice that while this provides a rough outline of the physical room, the geometry itself is often incomplete. Holes in the geometry have a negative effect on the acoustic simulation because acoustic energy will escape through these holes. This will cause a discrepancy in the simulated reverberation properties with respect to the real-world reverberation.

Figure 5:
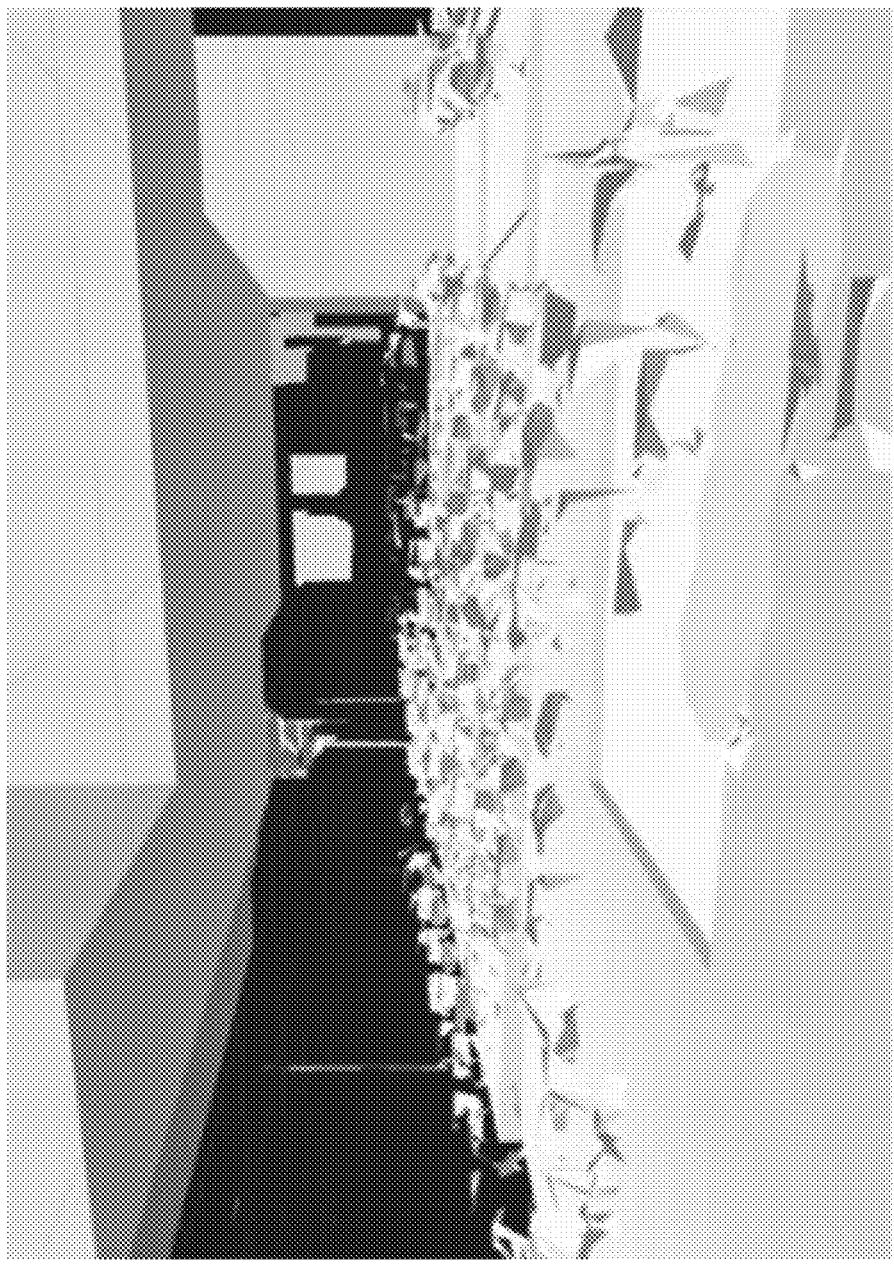
FIG. 5 is a cleaned and simplified geometric representation of the space of FIG. 4 according to an example embodiment.

A scene understanding API of device 310 fills in the walls and floor with flat planes. These planes are disambiguated with proper labels. The scene understanding API will also pick out surfaces such as tables. The resulting scene geometry contains water-tight/sound-tight rooms, preventing acoustical energy from erroneously leaking out of the room. This is the geometry used as an input to Project Acoustics. FIG. 5 shows the result of running the scene from FIG. 4 through the scene understanding API and shows that wall planes and platform planes have added.

Figure 6:
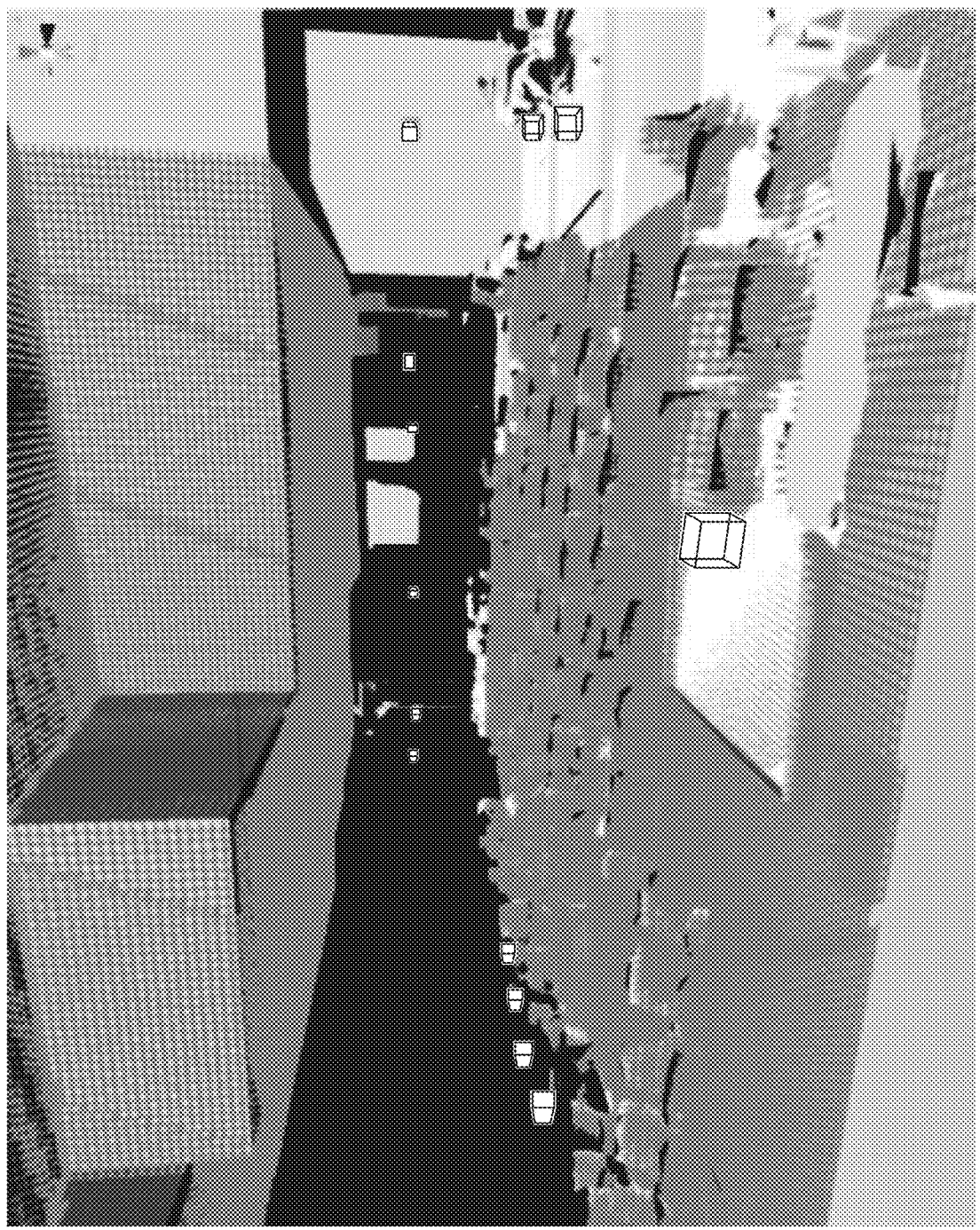
FIG. 6 is a voxelized representation of the space of FIG. 5 according to an example embodiment.

An acoustic simulation engine 315 is an offline wave solver which receives the scene geometry in a precompute step. In one embodiment, the engine 315 comprises a Microsoft Project Acoustics engine. The output of the scene understanding API of device 310 is fed as the primary input to the engine 315. The geometry is voxelized on a desktop PC by a preparation editor 320 to prepare for an acoustic bake. A representation of the theatre room that has been voxelized is shown in FIG. 6. Voxelization results in the space being represented by three-dimensional cubes. FIG. 6 only illustrates the objects within the space being represented by such cubes for purposes of convenience of illustration, however, the entire space, including open spaces are actually represented by the cubes.

Because engine 315 may be massively parallel, a compute cluster can be leveraged to significantly reduce the compute time. In one embodiment, Azure Batch may be used as the compute cluster. Upon completion of the bake, a resulting acoustic parameters metadata file is saved in cloud storage 325 for retrieval by client device 330. Cloud storage 325 provides a physical lookup table for the files and may include an ID 326 for each space and corresponding mesh 327, along with an ACE file 328 comprising the acoustic parameters generated by the engine 315. The file 328 may be compressed in one embodiment and decompressed for use by client device 330.

In one embodiment, acoustic parameters are provided for multiple probe points within the space.

Engine 315 simulations may be highly configurable. In one embodiment a 500 Hz maximum simulation frequency creates a good accuracy-to-compute-time ratio for typical physical spaces, such as a theatre room illustrated in FIG. 4. To prevent inter-probe interpolation from causing unnatural sound effects to be applied, horizontal probe spacing was limited to a maximum of 1.5 meters. In further embodiments, the wave based acoustic simulation has a simulation frequency of between 200 Hz and 1,000 Hz and a horizontal probe spacing of between 1 and 5 meters.

The client device 330 may apply the acoustic parameters to a virtual audio source, for example by using reverberation and equalization filters. In one embodiment, a rendering engine from Project Acoustics may be used to apply the acoustic simulation via a combination of head related transfer function (HRTF) and reverberation.

When developing in a purely virtual environment, it is easy to align virtual objects with their metadata because there is only a single coordinate system—the origin as defined by the simulation engine 315. When developing for augmented reality, great care is required to align the virtual and physical worlds. To realize this alignment, the spatial anchors 312 are used to define shared, persistent coordinate systems. The spatial anchor is world-locked in physical space and will be persisted on a single device across application/device restarts. For the purposes of a single virtual object, the coordinate system provided by a spatial anchor can take the place of a singular global origin.

However, a single, shared-coordinate system is not enough for complete alignment. There are four pieces of technology in architecture 300, each with its own coordinate system orientation expectations. Because of this, transforms between coordinate system definitions are used to get the expected result. The coordinate systems are defined as follows:

Scene Understanding API of device 310 delivers geometry in right-handed, Y-up, Z-backwards coordinates.

A game or other engine on client device 330, operates in left-handed, Y-up. Z-forwards coordinates.

Engine 315 ingests geometry in right-handed, Z-up, Y-backwards coordinates.

A rendering engine on client device 330 that plays back the audio renders audio in right-handed. Y-up, Z-backwards coordinates.

With these coordinate transforms in place, device 330 is able to utilize the acoustic bake comprising the acoustic parameters, ACE 328, to properly apply acoustic properties on virtual sound sources. Sound sources may lie between two or more probe points. Interpolation, such as linear interpolation, may be used to determine acoustic parameters for the sound source prior to rendering the sound.

There is still one more step to achieve the goal of sharing acoustic simulation data across devices. A spatial anchor 312 is only valid on the device that created it. Subsequent devices have no knowledge of the original spatial anchor. By leveraging Azure Spatial Anchors, the original spatial anchor can be shared with any AR-capable device 330 that is in the same physical space. A device 330 that is new to a space is able to quickly scan a minimal set of the geometry of the space (no need to scan the entirety of the space as the first device needed to), locate the anchor from the Azure spatial anchor store 312, then use the Azure spatial anchor ID 326 to locate the saved acoustic parameter metadata from cloud storage. With the Azure spatial anchor, the shared coordinate system is recreated, ensuring that virtual sound sources and acoustic metadata are properly realigned on the client device, even if that device has never been in the space before.

In some embodiments, a user wearing an AR device 330 may be the first to encounter a space. As such, there are no stored precomputed acoustic parameters associated with the space. The minimal set of geometry of the space may be used by the engine 315 to create an initial set of acoustic parameters that is not as robust as those that may be created via scanning done by device 310 to fully map the space. As the user explores the space with device 330, a complete triangle mesh of the space is created. The initial set of acoustic parameters may be used and may be progressively enhanced as the scan becomes more complete. The sound provided to the user is based on the initial set of acoustic parameters, which may provide the user with a lower quality sound, but a sound that is influenced by the actual geometry of the space and sounds fairly realistic.

Figure 7:
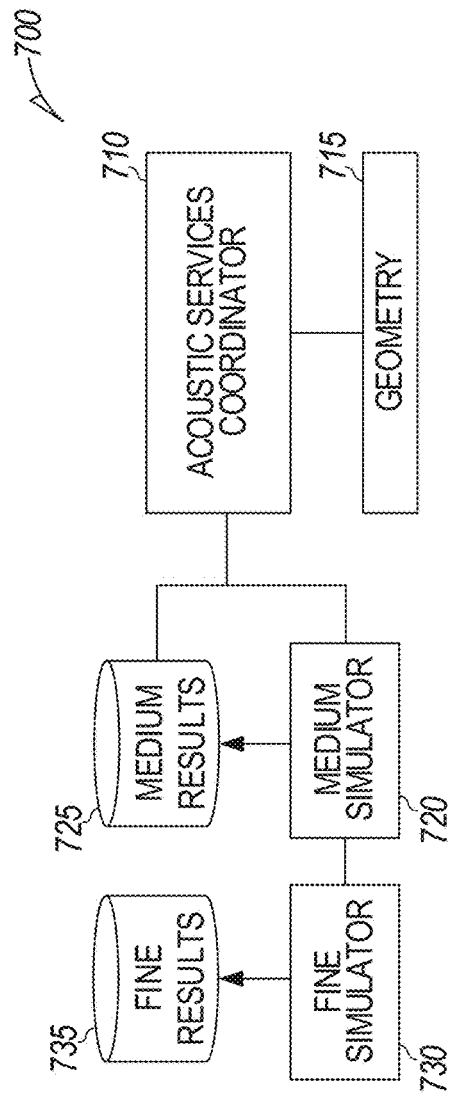
FIG. 7 is a block diagram of a system for generating varying granularities of acoustic parameters according to an example embodiment.

FIG. 7 is a block diagram illustrating an example system 700 for generating varying granularities of acoustic parameters. System 700 is currently implemented in Project Acoustics. An acoustic services coordinator 710 receives a minimal set of geometry 715 from the AR device and uses a medium simulator 720 to generate medium results 725 corresponding to the initial set of acoustic parameters. As more geometry is scanned by the AR device and provided at 715, a fine simulation 730 is used to obtain fine results 735. The transition from medium or fine simulation may be based on completion of a percentage of the geometry or completion of a full scan. As results 725 and 735 are generated, the results may be queried by coordinator 700 to provide corresponding sets of acoustic parameters of varying granularity to progressively enhance rendered audio by the AR device.

Figure 8:
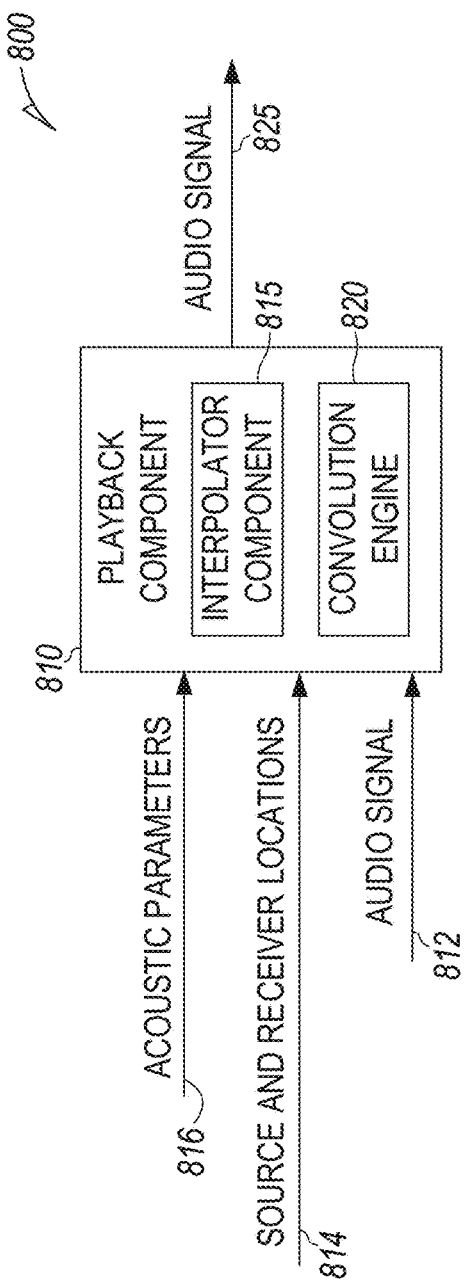
FIG. 8 a block diagram of an example system that facilitates real-time propagation of an arbitrary audio signal for rendering audio from a virtual audio source according to an example embodiment.

FIG. 8 a block diagram of an example system 800 that facilitates real-time propagation of an arbitrary audio signal for rendering audio from a virtual audio source. The system 800 comprises a playback component 810. The playback component 810 receives an arbitrary audio signal 812, a location of the source of the audio signal, and a location of the receiver of the audio signal in the space at 814. Responsive to receipt of the source and receiver locations, the playback component 810 accesses the acoustic parameters 816. A portion of the acoustic parameters accessed can be based upon source locations and receiver locations in the parameters that are associated with locations proximate to the received source and receiver locations in the space. The playback component 810 may include an interpolator component 815 that interpolates data between two or more portions of the acoustic parameters associated with locations proximate to the source and receiver locations. For instance, if the source location in the space is between two source locations that were subject to simulation by the numerical simulation, the interpolator component 815 can access portions of the data file pertaining to the two known source locations and can interpolate such portions of the data file to accord to the received location in the space. This can also be undertaken for various receiver locations.

The playback component 810 can perform an FFT on the received audio signal and can perform an FFT on the interpolated data. A convolution engine 820 may then be configured to convolve the audio signal with the interpolated data. Performing computing operations on signals in the frequency domain allows for real-time modification of the audio signal. The resulting audio signal 825 can be output via a speaker to a listener via an AR device.

In more detail, as the audio signal is received, it can be placed in, for instance, two buffers. Once the audio signal is placed in the frequency domain, the audio signal in the two buffers can be convolved with the current interpolated response signal (as generated by the interpolator component 815). The audio in the second buffer can be retained and used in connection with interpolating a subsequent signal.

Figure 9:
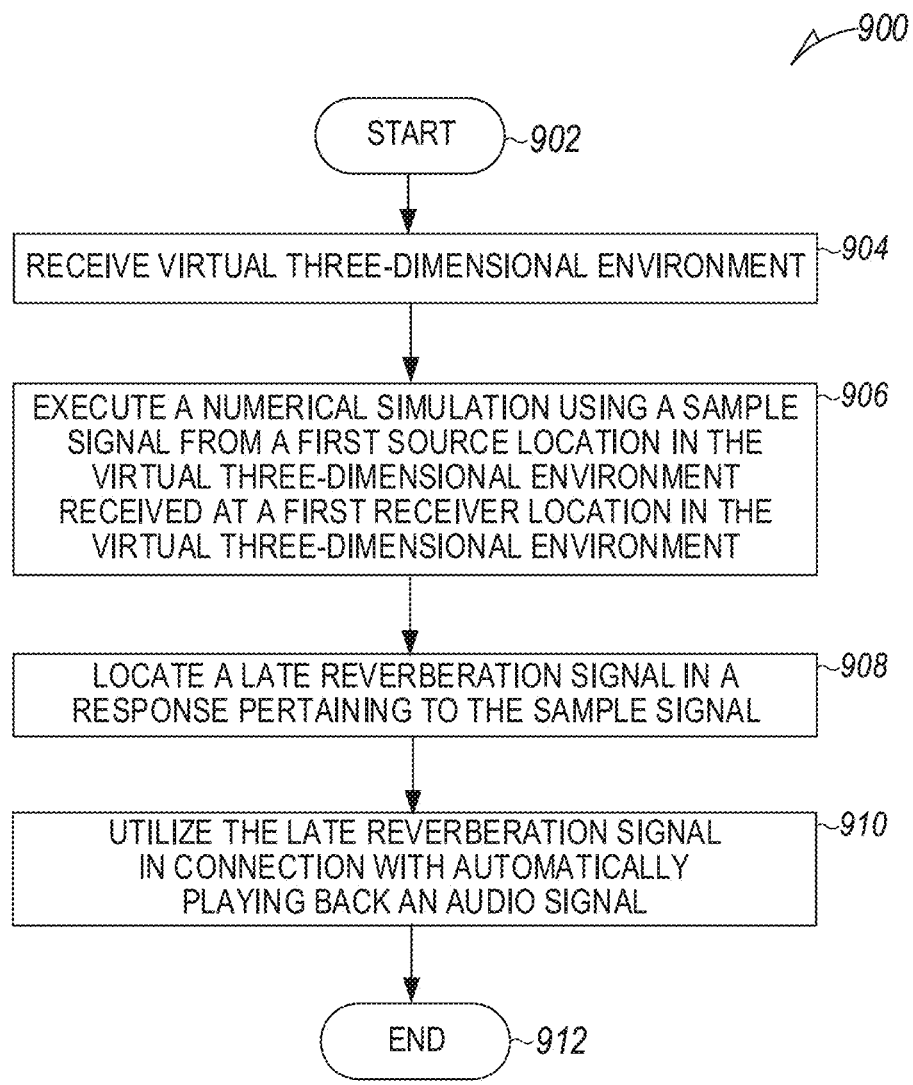
FIG. 9 is a flowchart illustrating a method that facilitates automatically propagating an audio signal in real time in a space with dynamic sources and/or receivers according to an example embodiment.
Figure 10:
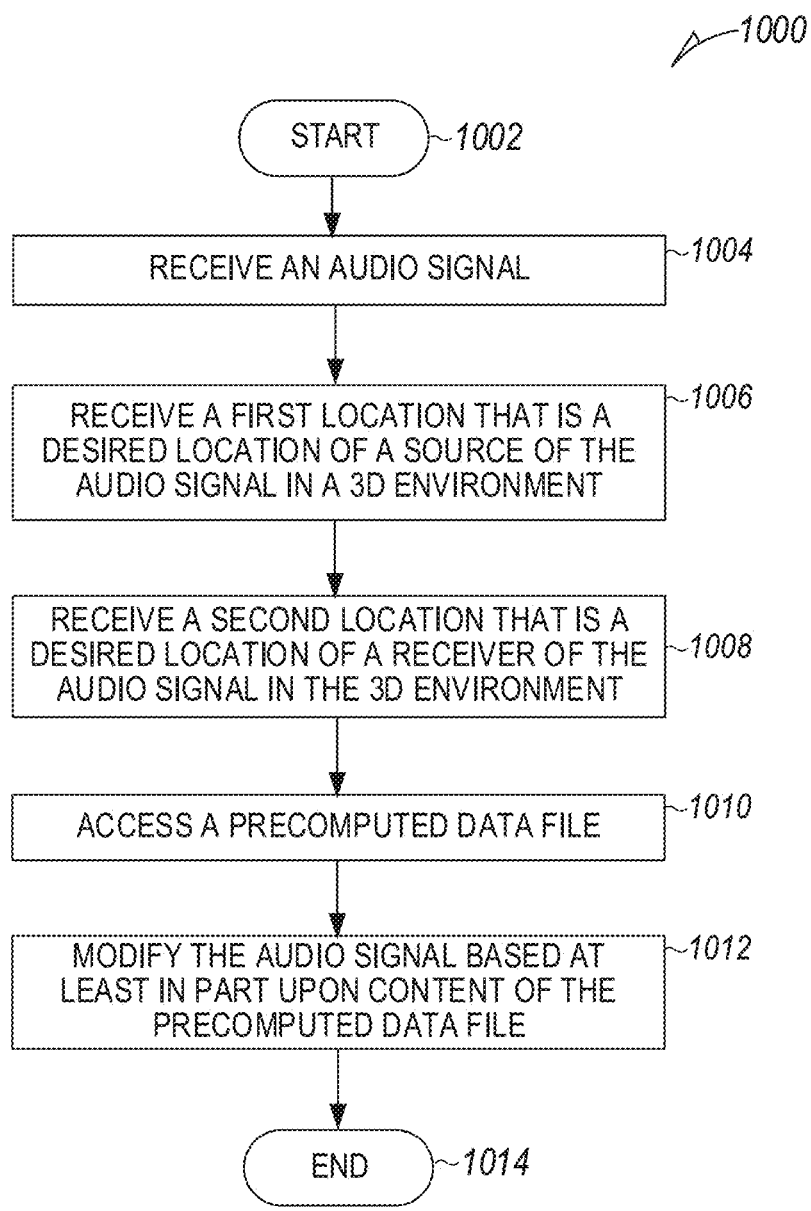
FIG. 10 is a flowchart representation of a computer implemented method that facilitates modifying audio in real-time through utilization of the pre-computed acoustic parameters according to an example embodiment.

FIGS. 9 and 10 are flowcharts illustrating various example computer implemented methods. The methods may be performed by one or more processors executing instructions to perform operations. While the methods are described as being a series of acts or operations that are performed in a sequence, it is to be understood that the methods are not limited by the order of the sequence. For instance, some operations may occur in a different order than what is described. In addition, an operation may occur concurrently with another operations. Furthermore, in some instances, not all operations may be required to implement a described method.

FIG. 9 is a flowchart illustrating a method 900 that facilitates automatically propagating an audio signal in real time in a space with dynamic sources and/or receivers. Method 900 may be performed by a Project Acoustics engine in some embodiments. The method 900 begins or starts at operation 902. At operation 904, a virtual three-dimensional environment is received. The three-dimensional environment may include geometry pertaining to the space and optionally absorption parameters pertaining to the environment, amongst other data.

At operation 906 a numerical simulation is executed in the geometric representation of the space using a sample signal from a first source location in the representation of the space and received at a first receiver location in the virtual three-dimensional environment. In an example, the first source location and the first receiver location can be identical.

At operation 908, a late reverberation portion of a response signal is located, wherein such response pertains to the sample signal utilized by the numerical simulator. At 910 the late reverberation signal is utilized in connection with automatically playing back (propagating) an arbitrary audio signal, as has been described above. The method 900 completes at 912.

FIG. 10 is a flowchart representation of a computer implemented method 1000 that facilitates modifying audio in real-time through utilization of the pre-computed acoustic parameters, such as by an AR device. Method 1000 starts at operation 1002. At operation 1004, an audio signal is received. At operation 1006, a first location is received, wherein the first location is a desired location of a source of the audio signal in the space.

At operation 1008, a second location is received, wherein the second location is a desired location of a receiver of the audio signal in the space. At 1010, a precomputed set of acoustic parameters is accessed, wherein the precomputed data file is based at least in part upon computed response signals with respect to a sample signal emitted from the source from a plurality of source locations and to a plurality of receiver locations in the three-dimensional environment. At operation 1012, the audio signal is modified based at least in part upon content of the precomputed acoustic parameters. The methodology 1000 completes at 1012.

Figure 11:
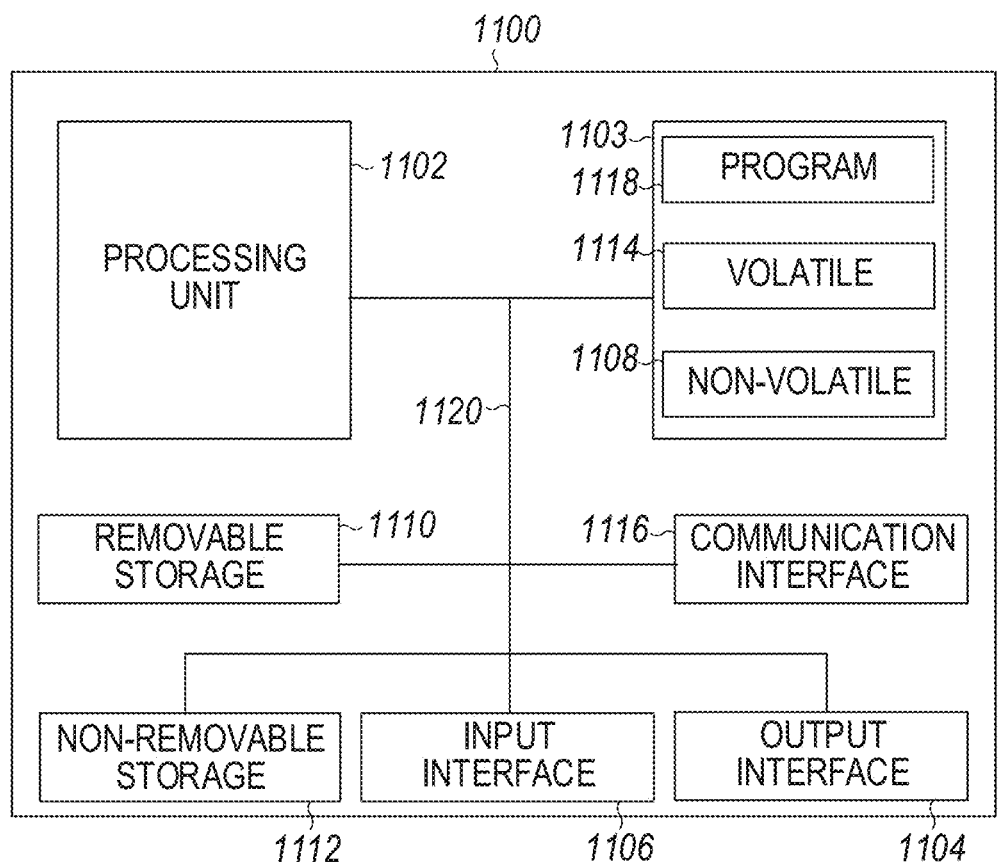
FIG. 11 is a block schematic diagram of a computer system to implement one or more example embodiments.

FIG. 11 is a block schematic diagram of a computer system 1100 to implement devices to perform methods and algorithms according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, AR headsets, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 11011. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more of the scanning, simulations, acoustic parameter generation, rendering, lookup table, and other functions. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

EXAMPLES

1. A mobile device implemented method provides audio from a virtual audio source in an augmented reality view of a scene. The method includes operations of sending scene identification data to a server storing precomputed acoustic parameters for multiple scenes, receiving precomputed acoustic parameters corresponding to the scene, aligning the view to register the audio to the augmented reality view of the scene, and rendering and playing the audio using the obtained acoustic parameters.

2. The method of example 1 wherein the precomputed acoustic parameters comprise a compressed file of parameters for multiple probe points and for multiple virtual audio sources within the scene.

3. The method of any of examples 1-2 and further comprising interpolating between probe points to play the audio based on a location of the virtual audio source in the scene.

4. The method of any of examples 1-3 wherein the scene identification data comprises a spatial anchor in the augmented reality view.

5. The method of any of examples 1-4 wherein the precomputed acoustic parameters are based on a wave based acoustic simulation performed on a voxelized geometric prior scan of the scene.

6. The method of example 5 wherein the wave based acoustic simulation has a simulation frequency of between 200 Hz and 1,000 Hz.

7. The method of any of examples 5-6 wherein the simulation had a horizontal probe spacing of between 1 and 5 meters.

8. The method of any of examples 5-7 wherein aligning the view comprises transforming multiple coordinate systems to a coordinate system corresponding to the mobile device.

9. The method of example 8 wherein the coordinate system of the rendering and playing on the mobile device is in right-handed, Y-up, Z-backwards coordinates and wherein the coordinate system of the precomputed acoustic parameters is in right-handed, Z-up, Y-backwards coordinates.

10. The method of example 9 wherein the voxelized geometric prior scan is in right-handed, Y-up, Z-backwards coordinates.

11. A machine-readable storage device has instructions for execution by a processor of a machine to cause the processor to perform a method to provide audio from a virtual audio source in an augmented reality view of a scene. The method includes operations of sending scene identification data to a server storing precomputed acoustic parameters for multiple scenes, receiving precomputed acoustic parameters corresponding to the scene, aligning the view to register the audio to the augmented reality view of the scene, and rendering and playing the audio using the obtained acoustic parameters.

12. The device of example 11 wherein the precomputed acoustic parameters comprise a compressed file of parameters for multiple probe points and for multiple virtual audio sources within the scene.

13. The device of any of examples 11-12 and further comprising interpolating between probe points to play the audio based on a location of the virtual audio source in the scene.

14. The device of any of examples 11-13 wherein the scene identification data comprises a spatial anchor in the augmented reality view.

15. The device of any of examples 11-14 wherein the precomputed acoustic parameters are based on a wave based acoustic simulation performed on a voxelized geometric prior scan of the scene.

16. The device of example 15 wherein the wave based acoustic simulation has a simulation frequency of between 200 Hz and 1,000 Hz and a horizontal probe spacing of between 1 and 5 meters.

17. The device of any of examples 15-16 wherein aligning the view comprises transforming multiple coordinate systems to a coordinate system corresponding to the mobile device.

18. The device of example 17 wherein the coordinate system of the rendering and playing on the mobile device is in right-handed, Y-up, Z-backwards coordinates, wherein the coordinate system of the precomputed acoustic parameters is in right-handed, Z-up, Y-backwards coordinates, and wherein the voxelized geometric prior scan is in right-handed, Y-up, Z-backwards coordinates.

19. A device includes a processor, a display coupled to the processor, and a memory device coupled to the processor and having a program stored thereon for execution by the processor to perform a method of providing audio from a virtual audio source in an augmented reality view of a scene. The method includes operations of sending scene identification data to a server storing precomputed acoustic parameters for multiple scenes, receiving precomputed acoustic parameters corresponding to the scene, aligning the view to register the audio to the augmented reality view of the scene, and rendering and playing the audio using the obtained acoustic parameters.

20. The device of example 19 wherein the precomputed acoustic parameters comprise a compressed file of parameters for multiple probe points and for multiple virtual audio sources within the scene, wherein the scene identification data comprises a spatial anchor in the augmented reality view, and wherein the operations further comprise interpolating between probe points to play the audio based on a location of the virtual audio source in the scene.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A mobile device implemented method of providing audio from a virtual audio source in an augmented reality view of a scene, the method including operations comprising:
    sending scene identification data to a server storing precomputed acoustic parameters for multiple scenes;
    receiving precomputed acoustic parameters corresponding to the scene;
    aligning the view to register the audio to the augmented reality view of the scene; and
    rendering and playing the audio using the obtained acoustic parameters.

2. The method of claim 1 wherein the precomputed acoustic parameters comprise a compressed file of parameters for multiple probe points and for multiple virtual audio sources within the scene.

3. The method of claim 1 and further comprising interpolating between probe points to play the audio based on a location of the virtual audio source in the scene.

4. The method of claim 1 wherein the scene identification data comprises a spatial anchor in the augmented reality view.

5. The method of claim 1 wherein the precomputed acoustic parameters are based on a wave based acoustic simulation performed on a voxelized geometric prior scan of the scene.

6. The method of claim 5 wherein the wave based acoustic simulation has a simulation frequency of between 200 Hz and 1,000 Hz.

7. The method of claim 5 wherein the simulation had a horizontal probe spacing of between 1 and 5 meters.

8. The method of claim 5 wherein aligning the view comprises transforming multiple coordinate systems to a coordinate system corresponding to the mobile device.

9. The method of claim 8 wherein the coordinate system of the rendering and playing on the mobile device is in right-handed, Y-up, Z-backwards coordinates and wherein the coordinate system of the precomputed acoustic parameters is in right-handed, Z-up, Y-backwards coordinates.

10. The method of claim 9 wherein the voxelized geometric prior scan is in right-handed, Y-up, Z-backwards coordinates.

11. A machine-readable storage device having instructions for execution by a processor of a machine to cause the processor to perform a method to provide audio from a virtual audio source in an augmented reality view of a scene, the method including operations comprising:
    sending scene identification data to a server storing precomputed acoustic parameters for multiple scenes;
    receiving precomputed acoustic parameters corresponding to the scene;
    aligning the view to register the audio to the augmented reality view of the scene; and
    rendering and playing the audio using the obtained acoustic parameters.

12. The device of claim 11 wherein the precomputed acoustic parameters comprise a compressed file of parameters for multiple probe points within the scene and for multiple virtual audio sources.

13. The device of claim 11 and further comprising interpolating between probe points to play the audio based on a location of the virtual audio source in the scene.

14. The device of claim 11 wherein the scene identification data comprises a spatial anchor in the augmented reality view.

15. The device of claim 11 wherein the precomputed acoustic parameters are based on a wave based acoustic simulation performed on a voxelized geometric prior scan of the scene.

16. The device of claim 15 wherein the wave based acoustic simulation has a 500 Hz maximum simulation frequency and a horizontal probe spacing of a maximum of 1.5 meters.

17. The device of claim 15 wherein aligning the view comprises transforming multiple coordinate systems to a coordinate system corresponding to the mobile device.

18. The device of claim 17 wherein the coordinate system of the rendering and playing on the mobile device is in right-handed, Y-up, Z-backwards coordinates, wherein the coordinate system of the precomputed acoustic parameters is in right-handed, Z-up, Y-backwards coordinates, and wherein the voxelized geometric prior scan is in right-handed, Y-up, Z-backwards coordinates.

19. A device comprising:
   a processor;
   a display coupled to the processor; and
   a memory device coupled to the processor and having a program stored thereon for execution by the processor to perform a method of providing audio from a virtual audio source in an augmented reality view of a scene, the method including operations comprising:
      sending scene identification data to a server storing precomputed acoustic parameters for multiple scenes;
      receiving precomputed acoustic parameters corresponding to the scene;
      aligning the view to register the audio to the augmented reality view of the scene; and
      rendering and playing the audio using the obtained acoustic parameters.

20. The device of claim 19 wherein the precomputed acoustic parameters comprise a compressed file of parameters for multiple probe points and for multiple virtual audio sources within the scene, wherein the scene identification data comprises a spatial anchor in the augmented reality view, and wherein the operations further comprise interpolating between probe points to play the audio based on a location of the virtual audio source in the scene.

* * * * *